Jan. 2, 1968 H. G. WARRINGTON 3,361,448
MAGNESIUM ALLOY DRILL ROD ASSEMBLY WITH
CERAMIC COATED COUPLING MEMBER
Filed Sept. 27, 1965
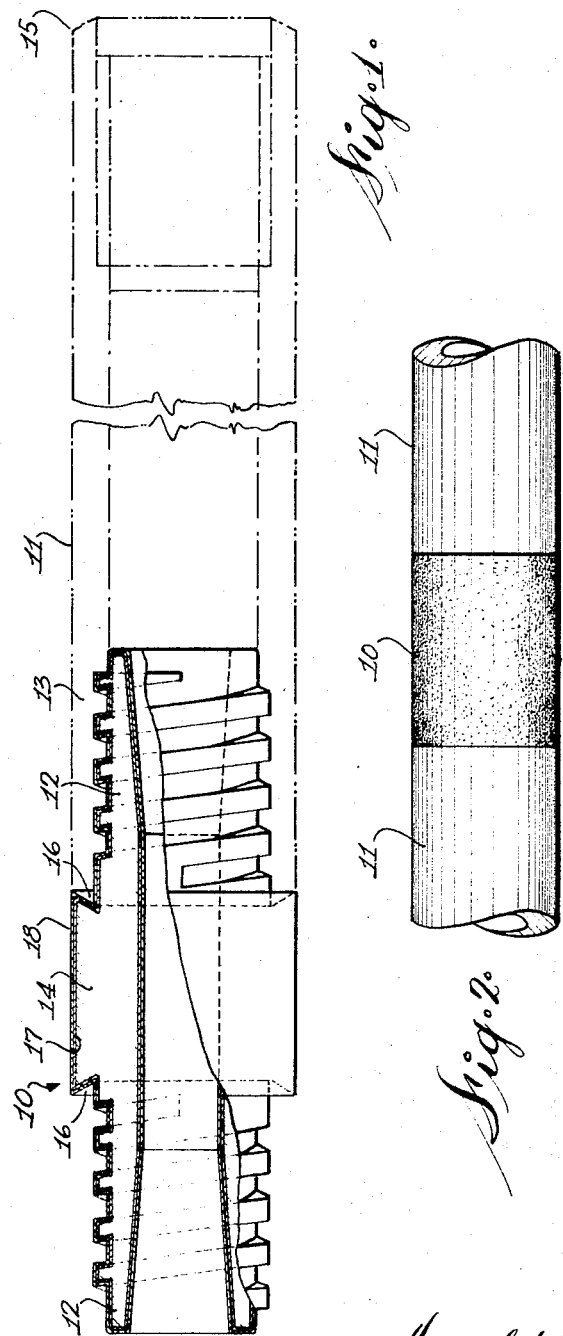

United States Patent Office 3,361,448
Patented Jan. 2, 1968

3,361,448
MAGNESIUM ALLOY DRILL ROD ASSEMBLY WITH CERAMIC COATED COUPLING MEMBER
Harold G. Warrington, Toronto, Ontario, Canada, assignor to Dominion Magnesium Limited, Toronto, Ontario, Canada
Filed Sept. 27, 1965, Ser. No. 495,017
1 Claim. (Cl. 285—55)

This invention relates to drill rods and couplings therefor such as are employed in rotary diamond drilling operations. This application is a continuation-in-part of U.S. Ser. No. 251,318, filed Jan. 14, 1963, and now abandoned.

Drill rod failure most frequently results from enlargement of the diameter of the end of a rod section such that the coupling is driven into the bore of the rod. This condition is usually known as a "belling" or "bell end." One means of preventing this condition is to chamfer the end of the rod and undercut the end of the coupling flange. This procedure, however, results in additional stress on the coupling threads, as well as on the sharp undercut shoulder.

Failure of the drill-rod coupling assembly is therefore most likely to occur in the coupling, the ultimate fracture involving a crack propagating from the stress concentration area at the base of one of the threads, or at the sharp change of section between the threaded portion and the shoulder. Examination of failed couplings reveals that contributing factors are fatigue, corrosion fatigue, and fretting. Failure most frequently occurs when drilling rock of variable mechanical properties such that shock loading is transmitted up the string of rods. Failure can also occur, however, during withdrawal of the string of rods when the stresses are due to the tensile load of the weight of the rods and the friction between rod and hole added to the tensile forces in the threads due to the tightening of the threads. This latter force is at a maximum in steel owing to its high elastic modulus (30,000,000 p.s.i.) and to the practice of using slack threads for ease of constant coupling and uncoupling for the purpose of removing test cores. The thread employed is usually a coarse square thread, normally three or four per inch. Thus, the maximum mechanical advantage, with the tools used, is between 250 and 500; that is, a torsion of, say, 50 pounds cannot exert a force of more than 25,000 pounds.

The maximum elastic extension of the threaded length on a rod of, for example, one square inch area of metal, is therefore less than 0.001 inch or about 2/10,000 inch per thread. This is not sufficient, even if the elastic limit of the steel is high enough, to engage more than one thread. Even if the thread is tightened further by mechanical devices, or by jamming in the hole, and even if precision ground threads are employed, it would still not be possible to distribute the load over the threaded length. Furthermore, the fatigue limit would be exceeded and the limit of elastic extension surpassed before contact is made on all thread surfaces. The full tensile load is thus exerted on the sharp corner between the end of the drill rod and the shoulder of the coupling.

Generally speaking, therefore, failure can be said to be due to the fact that full load carrying contact is restricted to a small area, and loading is so high that the fraying surfaces cannot be separated by lubricant. This leads to disruption by fretting, and the resulting small discontinuities transmit cracks to the sharp notch at the base of the thread, where the stress concentration caused continued crack propagation to ultimate rupture.

A material of lower modulus in itself will not wholly answer this problem, even if the elastic limit is high enough that distributed loading can be obtained over the threaded area. Intimate metallic contact over this area would negate the effect of a lubricant under conditions of constant vibration and permit development of Van de Waals forces approaching the theoretical maximum, at which point complete binding of the threads occurs. It is known that the interposition of a non-metallic substance between the surfaces is the most effective way to reduce these forces. This is relatively simple in the case of rolling contact where compressive forces will maintain a constant film, even of molecular thickness, of non-metallic material of low shear value. However, in the case of square thread surfaces with limited movement and high pressures, the usual surface films will break and wear off and metal to metal contact will result.

An object of this invention is to provide an improved coupling for drill rod sections whereby operating failures of drill rod assemblies are sharply reduced.

A more specific object of the invention is to provide a drill rod coupling of magnesium alloy having a surface film which is effective in preventing binding of the threads thereof when in use, and which makes possible closer machined tolerances on the threads without introducing any difficulty in the steps of coupling and uncoupling of the drill rod sections associated therewith.

Another object is to provide a drill rod assembly having drill rod sections and couplings of magnesium alloy and wherein a substantial saving in weight is effected with a reduced susceptability to failure in operation.

Other objects, details and advantages will be apparent from the ensuing description, with particular reference to the accompanying drawing, in which FIGURE 1 is a side elevation, partly in section, of a drill rod coupling in accordance with the invention, and FIGURE 2 is a side elevation of a drill rod assembly in accordance with the invention.

In the drawing, the coupling 10 and the drill rod sections 11 are of conventional shape and sizes. The coupling is a tubular member having square threaded end portions 12 for threaded engagement with the internally threaded end portions 13 of the drill rod sections, and an intermediate portion 14 having the external diameter of the drill rod. The end of the rod may be chamfered, as shown at 15, for engagement with the undercut surface of the shoulder 16 at each end of the portion 13.

The coupling 10 and drill rod sections are formed from a magnesium alloy. It will be apparent that the most desirable mechanical and physical properties required are the highest possible tensile yield strength combined with the lowest possible modulus of elasticity. The most suitable magnesium alloys for this purpose are those of the ZK series which contain about 4 to 6% zinc, about 0.5 to 0.7% zirconium, and balance magnesium of high purity, preferably of minimum purity 99.95%. The following is the composition of alloys of this series.

ZK51—4.5% Zn, 0.7% Zr
ZK61—6.0% Zn, 0.8% Zr
ZK60—5.5% Zn, 0.5% Zr

The ZK60 alloys are particularly suitable. The 0.1% yield stress in tension is typically 40,000 p.s.i. with a Modulus E of 6,500,000 p.s.i. This gives a ratio of 1/137. In comparison, one of the highest grades of steel for this purpose would have a yield point of 100,000 p.s.i. with a modulus of 30,000,000, or a ratio of 1/300, which is less than half as effective.

The magnesium alloy coupling is machined from extruded alloy rod which has been toughened by precipitation hardening to, say, the —T5 condition, or solution treated and water quenched, if desired, followed by precipitation hardening to the —T6 condition. To reduce stress concentration, the base of the thread is radiused slightly, and, in place of the dimensional tolerance of plus or minus .006–.01 inch in conventional steel couplings, a tolerance of .001–.002 inch may be provided.

A surface film of a ceramic nature, which is harder and more brittle than the metal, is now formed on the coupling surface by anodizing the magnesium alloy material of the coupling above the spark potential. The anodic treatment is carried out by known commercial procedures, such as that known under the trade name "Dow 17" or the HAE treatment. This treatment produces a brittle ceramic-like surface film 17 having a thickness of 0.001–0.002 inch.

The "Dow 17" anodizing procedure is essentially a one-step anodic treatment employing an aqueous acidic bath containing a combination of a phosphate, a fluoride and a chromate in which either direct or alternating, low or high voltage, current produces the desired coating.

The HAE procedure is an anodic treatment employing a potassium hydroxide-aluminum hydroxide-trisodium phosphate-potassium fluoride-potassium manganate bath in which alternating current produces the refractory coating.

Since the film 17 is brittle, it will break up or shatter into a multiplicity of angular particles on the screw thread surfaces of the coupling in response to threading and other pressures thereon during use. These pressures will grind the angular particles into the surface area of the body of magnesium alloy forming the coupling and it is a critical characteristic of the present invention that such angular particles be formed and that they be subsequently ground into the coupling body.

It will be apparent, however, that, if a substantially uniform surface area composed of such ground in particles is to be achieved, means must be provided to hold such particles in place until they are permanently anchored in the threaded coupling surfaces. To this end, a coating 18 of hard resin or lacquer is applied to the threaded surfaces of the coupling following the anodic treatment. Commercially available epoxy resin lacquers are suitable. For convenience of production, the entire coupling, immediately following completion of the anodic treatment, may be dipped into a lacquer bath and the resulting coating dried thereon by baking or the like. The coating 18 thus forms a protective layer on the coupling during handling thereof as well as the particle retaining means described.

It has been found that the final surface film composed of the ground in particles provides a surface condition which effectively prevents binding of the threads during use of the coupling in a drill rod assembly. Moreover, it has also been found that such surface condition remains substantially constant throughout the life of the coupling, which life is at least as great as that of any conventional coupling. The conditions of operation under which the coupling surface in accordance with the present invention retains its character are arduous. Repeated use of the coupling occurs, not only by the drilling of successive holes but also during a drilling of any one hole when the rod may be withdrawn many times for the purpose of extracting core samples and relowered to the drilling depth.

In a further aspect of the invention, there is provided a drill rod assembly composed of couplings as hereinbefore described and drill rod sections formed of the same magnesium alloy from which the couplings are formed.

There is, of course, a distinct primary advantage in producing the drill rod sections of the same material as that of the couplings therefor. However, in the use of drill rods of aluminum alloy, which use is quite extensive in the mining and drilling industry, couplings of steel must be used therewith. While aluminum alloy couplings with an anodized finish on the threads thereof have been propsed, it has been found impossible to maintain such anodized finish since it deteriorates rapidly and, on deterioration, the coupling threads seize or freeze on those of the rod. The onodic coating on the aluminum alloy is of slightly flexible nature and it wears away quickly in minute flakes which however do not become embedded in the metal of the coupling. Thus, the metal surface of the aluminum alloy threads becomes bare, and the resulting bare metal surface cold welds to a metal surface with which it is in pressure engagement.

There is a highly important incidental advantage in the use of a drill assembly in which both couplings and rods are formed of magnesium alloy. The following are comparative weights of 2000 feet of standard size diamond drill rod assemblies using ten foot rods:

| | Lbs. |
|---|---|
| Steel rods and couplings | 7800 |
| Aluminum alloy rods and steel couplings | 2998 |
| Magnesium alloy rods and couplings of the present invention | 1714 |

It will be obvious that the handling and operation of drilling assemblies will be greatly facilitated and the field of use very much expanded by the employment of lighter weight magnesium alloy assemblies.

Another feature of the present invention resides in the fact that, while in the conventional steel coupling a dimensional tolerance of plus or minus .006–.01 inch is required, a tolerance in the present coupling of .001–.002 may be employed, and this allows for a surface coating thickness of 0.0006 inch plus or minus .0002 inch. Despite the use of much closer tolerances, no difficulty is experienced in coupling and uncoupling the rod-coupling combination. Binding does not occur in service even though the thread surfaces appear worn.

I claim:

1. A drill rod assembly comprising a plurality of drill rod sections and a coupling for connecting said drill rod sections, said drill rod sections and said coupling being entirely formed of a magnesium alloy comprising zinc 4 to 6%, zirconium 0.5 to 0.7%, and balance magnesium, said coupling having threaded end portions and an anodic film of ceramic nature and being harder and more brittle than said alloy extending over the entire surfaces of said coupling including said threaded end portions thereof, and a sealing resinous coating completely overlying and bonded to said film, each said drill rod section having a threaded end portion for threaded engagement with one of said threaded end portions of said coupling, said film on said threaded end portions of said coupling being shatterable into a multiplicity of angular particles in response to pressure resulting from said threaded engagement, said resinous coating retaining said particles in place on said coupling end portions, said particles being frictionally anchorable in said coupling end portions in response to pressure thereon to form a subtantially coherent layer thereon.

References Cited

UNITED STATES PATENTS

| 2,656,857 | 10/1953 | Cavallier | 285—94 X |
| 2,934,480 | 4/1960 | Slomin | 204—56 X |
| 3,100,933 | 8/1963 | Hancock et al. | 29—470.1 |

CARL W. TOMLIN, *Primary Examiner.*

T. A. LISLE, D. W. AROLA, *Assistant Examiners.*